(12) United States Patent
Kuwabara et al.

(10) Patent No.: US 7,099,265 B2
(45) Date of Patent: Aug. 29, 2006

(54) OFDM COMMUNICATION SYSTEM AND TRANSMITTER-RECEIVER FOR USE IN THE SYSTEM

(75) Inventors: Masahiro Kuwabara, Yokosuka (JP); Manabu Sawada, Yokohama (JP); Kunihiko Sasaki, Kuwana (JP)

(73) Assignee: DENSO Corporation, Kariya (JP)

( * ) Notice: Subject to any disclaimer, the term of this patent is extended or adjusted under 35 U.S.C. 154(b) by 824 days.

(21) Appl. No.: 09/872,330

(22) Filed: Jun. 1, 2001

(65) Prior Publication Data

US 2002/0018483 A1 Feb. 14, 2002

(30) Foreign Application Priority Data

Jun. 1, 2000 (JP) ............................. 2000-164885

(51) Int. Cl.
*H04J 11/00* (2006.01)
(52) U.S. Cl. ..................................... 370/203; 375/299
(58) Field of Classification Search ................ 370/204, 370/240, 210; 375/135, 136
See application file for complete search history.

(56) References Cited

U.S. PATENT DOCUMENTS

| 4,083,009 A * | 4/1978 | Bickford et al. ............. 375/347 |
| 5,809,083 A * | 9/1998 | Wright ........................ 375/285 |
| 5,933,421 A | 8/1999 | Alamouti et al. |
| 6,002,672 A * | 12/1999 | Todd ........................... 370/252 |
| 6,151,372 A | 11/2000 | Yamamoto |
| 2003/0058786 A1 * | 3/2003 | Sato et al. .................. 370/203 |

FOREIGN PATENT DOCUMENTS

| JP | A1-10-145273 | 5/1998 |
| JP | A-11-205273 | 7/1999 |
| JP | A-2000-036801 | 2/2000 |

OTHER PUBLICATIONS

Japanese Office Action dated Sep. 28, 2004 with excerpt translation.
Sudo, et al., "A Study on Transmission Diversity for MMAC System," The Institute of Electronics, Information and Communication Engineers, Technical Report No. SST99-87, Kanagawa, pp. 87-92, Feb. 2000.

* cited by examiner

*Primary Examiner*—Chau Nguyen
*Assistant Examiner*—Christopher Grey
(74) *Attorney, Agent, or Firm*—Harness, Dickey & Pierce, PLC

(57) ABSTRACT

A diversity OFDM communication is performed between a base terminal and a mobile terminal, both having a horizontal polarization antenna and a vertical polarization antenna forming two transmission channels. In the base terminal, data signals to be transmitted are divided into two channels to transmit the data signals through either one of the channels having a higher transmission performance for each sub-carrier. Common pilot signals are transmitted through both channels. The data signals received by the mobile terminal are phase-adjusted using the common pilot signals. The phase-adjusted data signals in both channels are synthesized and then demodulated.

8 Claims, 12 Drawing Sheets

US 7,099,265 B2

OFDM COMMUNICATION SYSTEM AND TRANSMITTER-RECEIVER FOR USE IN THE SYSTEM

CROSS-REFERENCE TO RELATED APPLICATION

This application is based upon and claims benefit of priority of Japanese Patent Application No. 2000-164885 filed on Jun. 1, 2000, the content of which is incorporated herein by reference.

BACKGROUND OF THE INVENTION

1. Field of the Invention

The present invention relates to an OFDM (Orthogonal Frequency Division Multiplexing) communication system and receiver-transmitters for use in the system as a base terminal and a mobile terminal.

2. Description of Related Art

It is generally known to use the OFDM communication system in MMAC (Multimedia Mobile Access Communication) as an effective transmission system under a multi-pass environment. To improve error rate performance in the OFDM communication system, transmission diversity techniques are proposed in an article entitled "A Study on Transmission Diversity for MMAC System" (SST99-87, pages 87–92), which is published in an technical report of The Institute of Electronics, Information and Communication Engineers.

The essence of the proposed transmission diversity system will be briefly explained with reference to FIG. 10. The system includes a base terminal A having a transmitter-receiver and a mobile terminal B having a transmitter-receiver. Two antennas 1, 2 are provided in the base terminal A. The receiver in the base terminal A receives OFDM signals through both antennas 1, 2. The received OFDM signals are respectively processed by FFT (Fast Fourier Transform) processors 16, 17. This process is a process to transform signals in time-region into signals in frequency-region (referred to as FFT-process). The FFT-processors 16, 17 output a pair of branch signals, respectively. A signal level detector 18 detects the levels of the signals in both branches and determines one branch which has a higher level for each sub-carrier. A selector 21 selects a signal having a higher level for each sub-carrier. A demodulator 22 demodulates selected signals and outputs a series of digital data.

A modulator 23 in the transmitter of the base terminal A modulates signals to be transmitted and feeds the modulated signals to a gain controller 24. The gain controller 24 controls the gain of each sub-carrier signal based on the signal levels detected by the level detector 18, so that the signal levels of all the sub-carriers at the receiving end, i.e., at the mobile terminal B, become equal. The gain-controlled signals for respective sub-carriers are fed to a selector 25. The selector 25 selects a branch (an IFFT processor 29 or 30) having a higher signal level for each sub-carrier based on the information fed from the level detector 18. Each sub-carrier signal is processed in a selected IFFT-processor (Inverse Fast Fourier Transform Processor), 29 or 30, to form OFDM signals. The IFFT-processor 29, 30 converts signals in frequency-region into signals in time-region, and this process is referred to as an IFFT-process. The OFDM signals are transmitted from both antennas 1, 2, respectively, through R-F processors (not shown). In the example shown in FIG. 10, sub-carriers f1 and f2 are sent out form the first branch including the IFFT-processor 29 and the antenna 1, while sub-carriers f3 and f4 are sent out from a second branch including the IFFT-processor 30 and the antenna 2.

The receiver in the mobile terminal B receives the OFDM signals sent out from the antennas 1, 2 through a single antenna 101. The OFDM signals received are FFT-processed by an FFT-processor 102 and demodulated by a demodulator 121. On the other hand, signals to be transmitted from the mobile terminal B are modulated by a modulator 122 and IFFT-processed by an IFFT-processor 125, and then transmitted from the antenna 101.

In the proposed diversity system, the error rate performance in the OFDM communication can be improved, since either one of the branches showing a higher transmission performance is selectively used for each sub-carrier. In addition, since the gain of each sub-carrier is controlled at the transmitting end so that signal levels of all the sub-carriers become equal at the receiving end, the error rate performance can be further improved.

However, there is a following problem in the proposed diversity system. The OFDM signals include, in addition to data signals, pilot signals for demodulating the data signals at the receiving end. The phase of the data signals has to be adjusted by the pilot signals. For this purpose, a phase adjuster is provided between the FFT-processor 102 and the demodulator 121, though it is not shown in FIG. 10. The phase adjuster is shown in FIG. 11. The data signals are extracted from the FFT-processed OFDM signals by a data signal extractor 41, while the pilot signals are extracted by a pilot signal extractor 42. A pilot signal generator 43 generates reference pilot signals that have the same amplitude and phase as those of the pilot signals of the transmitting end. A phase-rotation calculator 44 calculates an amount of phase-rotation in the pilot signals received based on the reference pilot signals fed from the pilot signal generator 43. A phase adjuster 45 adjusts the phase of the data signals received using the calculated amount of phase-rotation.

In the proposed diversity system, the data signals and the pilot signals are sent out from either one of the branches selected for each sub-carrier. More particularly, as shown in FIG. 12, each data signal (shown with a thin line) of a given sub-carrier is sent out from either one of the branches (an atenna 1 or 2) selected for that sub-carrier, and each pilot signal (shown with a thick line) of a given sub-carrier is sent out from one of the branches (an antenna 1 or 2) selected for that sub-carrier. If the signals under the same sub-carrier are sent from both antennas, the signals interferes with one another. To avoid the interference, a signal of each sub-carrier is transmitted from only one antenna.

As shown in FIG. 12, the OFDM signals sent out from the two antennas 1, 2 are received by a single antenna 101, FFT-processed by a FFT processor 102. Then, the data signal phase is adjusted by a phase adjuster 103, and the data signals are demodulated by a demodulator 121. That is, the signals sent out from two antennas through different routes are received by one antenna and handled as if the signals were a single signal. Since the signals transmitted through different routes have respectively different phase-rotations, the phase adjustment cannot be done accurately if the signals are handled as a single signal.

SUMMARY OF THE INVENTION

The present invention has been made in view of the above-mentioned problem, and an object of the present invention is to provide an improved OFDM communication system using transmission diversity, in which the signal phase is accurately adjusted and transmission can be performed with high efficiency.

OFDM signals including data signals and pilot signals therein are transmitted from a transmitter and received by a receiver, both of the transmitter and the receiver having a horizontal polarization antenna and a vertical polarization antenna, respectively. The transmitter determines an antenna which shows a higher performance for each sub-carrier frequency based on levels of the signals received by a receiving device included in the transmitter. To transmit the data signals from either one of the antennas having a higher performance for each sub-carrier, the data signals to be transmitted are divided into two groups, a first group to be transmitted from the horizontal polarization antenna and a second group to be transmitted from the vertical polarization antenna.

Then, the same pilot signals are inserted commonly into the first group of data signals and the second group of data signals, thereby forming a first OFDM signals to be transmitted from the horizontal polarization antenna and a second OFDM signals to be transmitted from the vertical polarization antenna. In other words, the pilot signals are included in both OFDM signals at common positions on the sub-carrier frequency axes.

The receiver receives the first OFDM signals through its horizontal polarization antenna and the second OFDM signals through its vertical polarization antenna. OFDM signals received through two channels are respectively processed through respective FFT-processors. The respective data signals included in both OFDM signals are phase-adjusted using the common pilot signals. The respective phase-adjusted data signals are synthesized, and then the synthesized data signals are demodulated.

Since the data signals are transmitted from and received by either one of two antennas having a higher performance for each sub-carrier frequency, and the received data signals are phase-adjusted using the pilot signals commonly included in both OFDM signals, the phase of the data signal is accurately adjusted at the receiving end, and communication can be efficiently performed.

Alternatively, the same data signals to be transmitted may be included in both of the first and second OFDM signals together with the common pilot signals. In this case, the receiver selects data signals having a higher level for each sub-carrier and demodulates the selected data signals.

Other objects and features of the present invention will become more readily apparent from a better understanding of the preferred embodiments described below with reference to the following drawings.

DETAILED DESCRIPTION OF THE PREFERRED EMBODIMENTS

Figure 10:
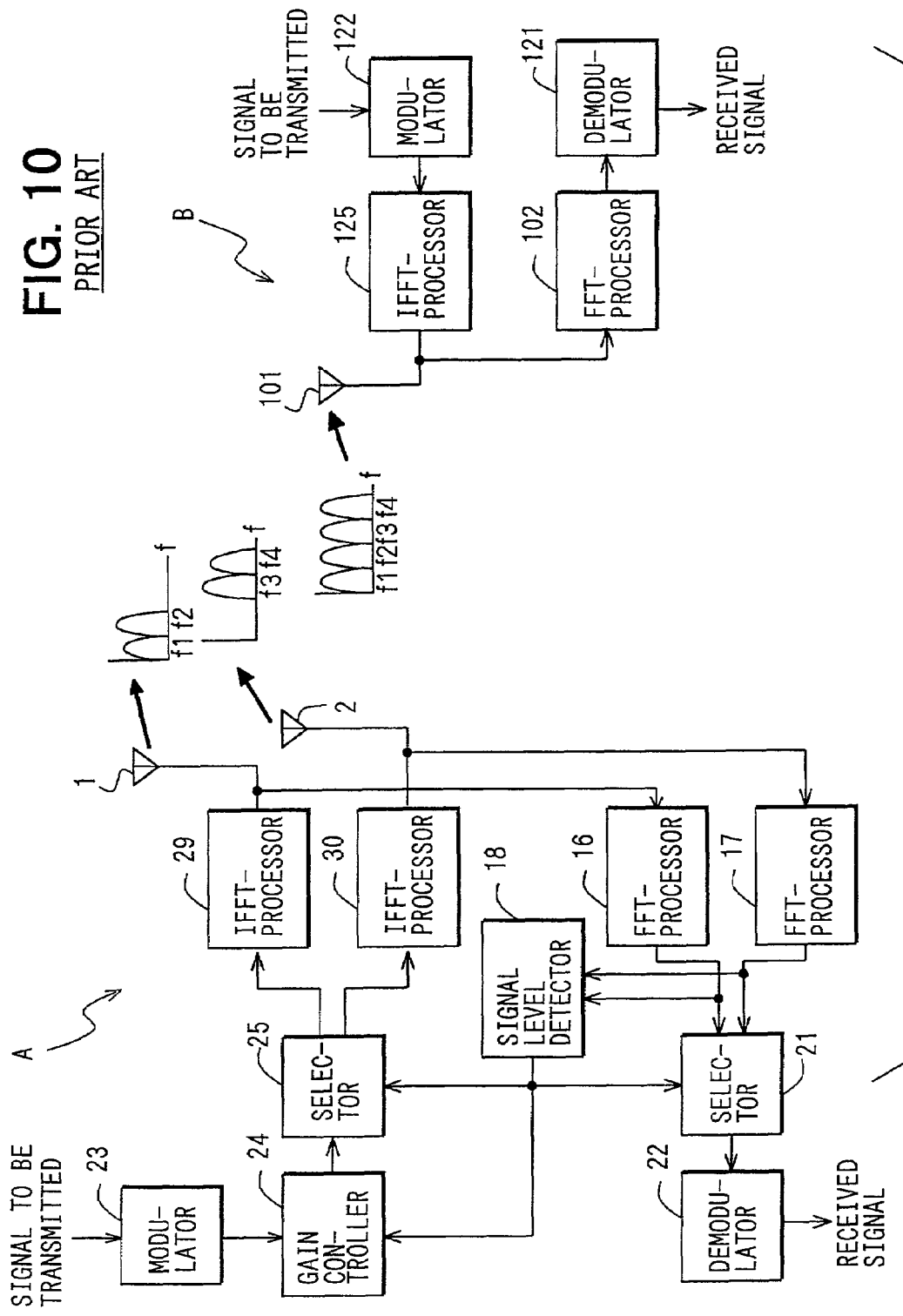
FIG. 10 is a conceptual block diagram showing a conventional OFDM communication system.
Figure 11:
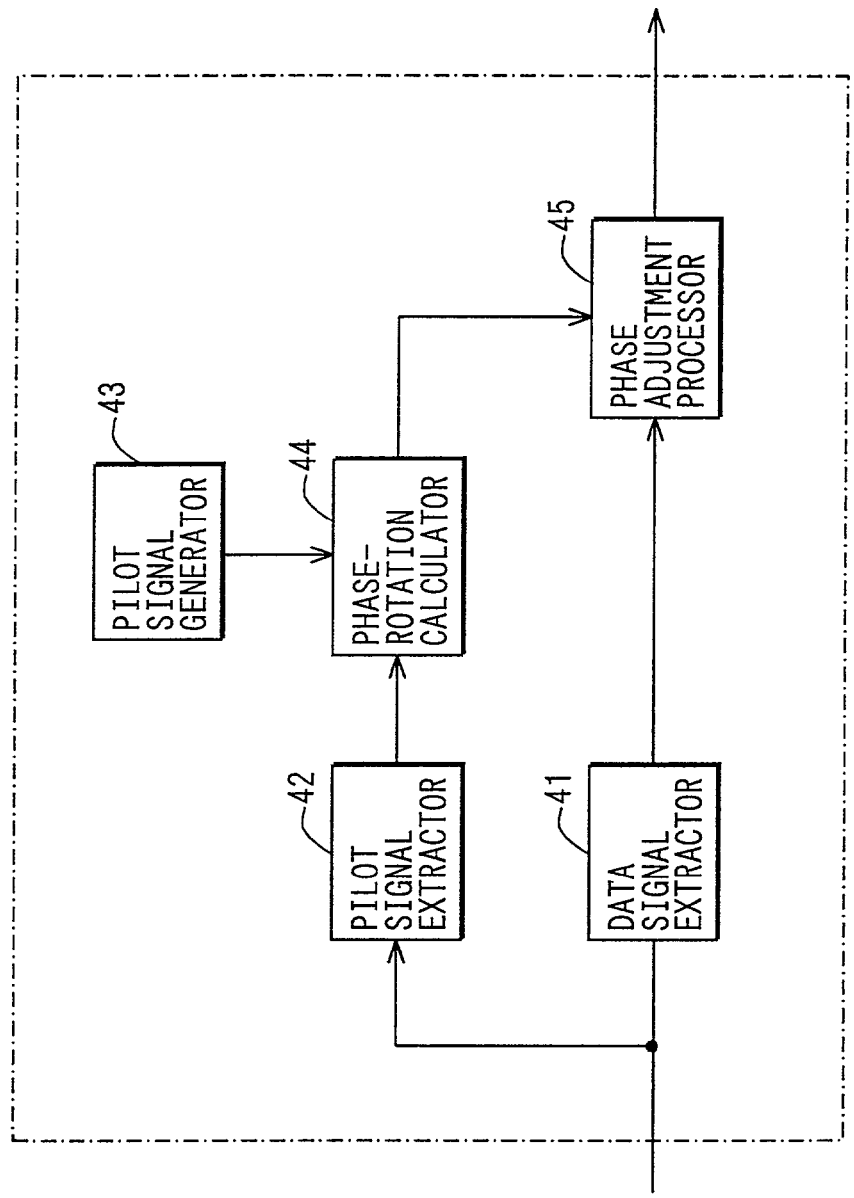
FIG. 11 is a block diagram showing a phase adjuster used in the system shown in FIG. 10.
Figure 12:
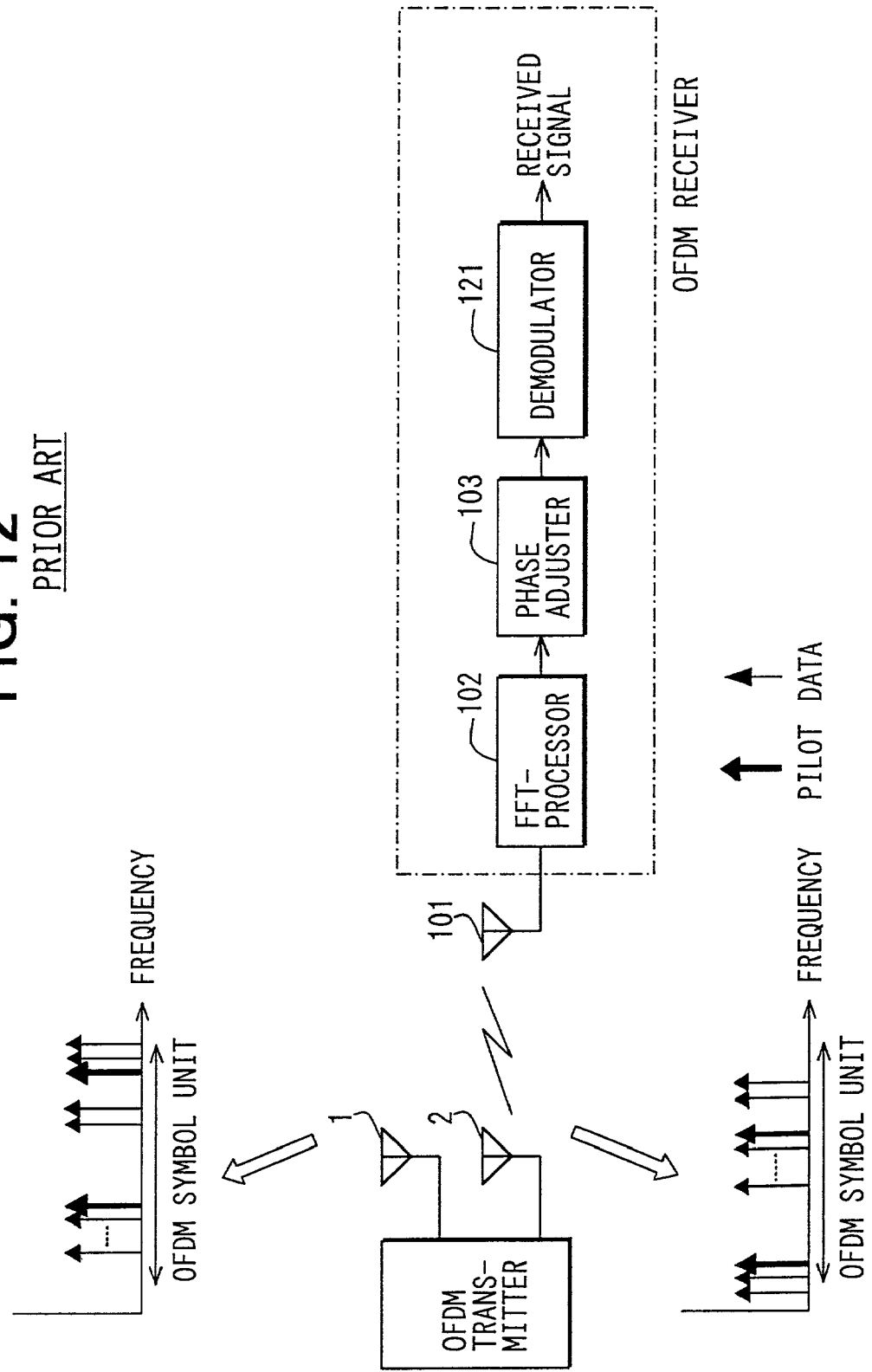
FIG. 12 is a chart showing OFDM signals and related components used in the conventional OFDM communication system shown in FIG. 10.

A first embodiment of the present invention will be described with reference to FIGS. 1–7. Components shown in FIGS. 1–7 having the same reference numbers as those in FIGS. 10–12 are the same or substantially same components as those shown in FIGS. 10–12. First, referring to FIG. 1, an entire structure of the OFDM communication system using diversity transmission according to the present invention will be briefly described. A pair of antennas, a horizontal polarization antenna 10 and a vertical polarization antenna 11, are provided in a base terminal A. Similarly, a mobile terminal B includes a pair of antennas, a horizontal polarization antenna 110 and a vertical polarization antenna 111. By using horizontally polarized waves and vertically polarized waves, interferences between signals are avoided if same signals are sent using the same sub-carrier frequencies.

In the mobile terminal B, signals received through the horizontal polarization antenna 110 are FFT-processed by an FFT-processor 116, and the phase of the signals is adjusted by a phase adjuster 118. Signals received through the vertical polarization antenna 111 are FFT-processed by an FFT-processor 117, and the phase of the signals is adjusted by a phase adjuster 119. The respective phase-adjusted data signals are synthesized by a sub-carrier synthesizer 120, and then the synthesized data signals are demodulated by a demodulator 121. That is, both signals communicated between the horizontal polarization antennas 10, 110 and between vertical polarization antennas 11, 111 are respectively phase-adjusted. Therefore, the phases of the respective signals can be accurately adjusted.

Figure 1:
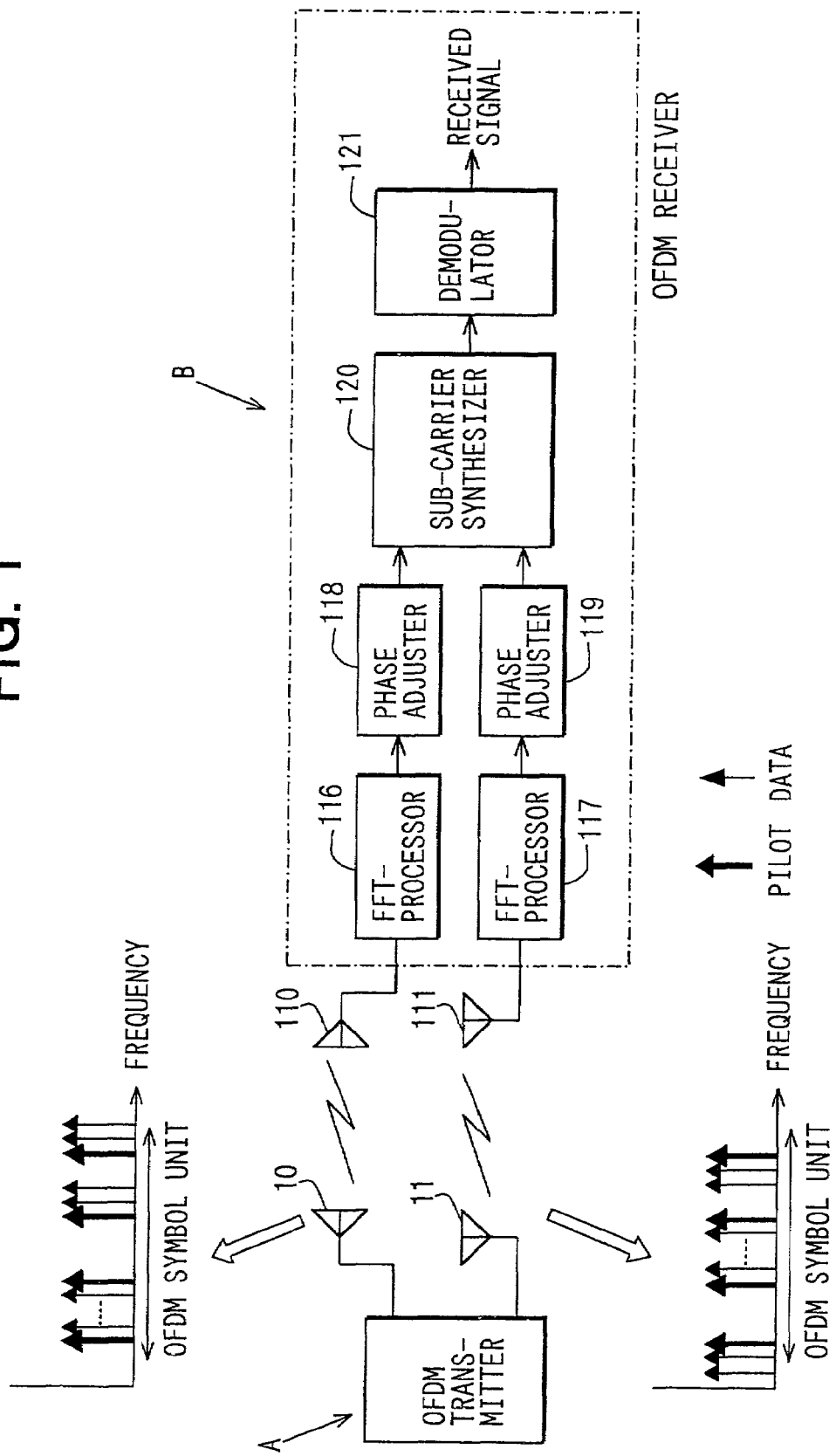
FIG. 1 is a conceptual block diagram showing an OFDM communication system as a first embodiment of the present invention.

An OFDM symbol unit sent out from the horizontal polarization antenna 10 and an OFDM symbol unit sent out from the vertical polarization antenna 11 are shown in FIG. 1, respectively. Each symbol unit includes pilot signals (shown with a thick line) and data signals (shown with a thin line). A data signal on one sub-carrier frequency is sent out form either one of the antennas 10 or 11, while a pilot signal on one sub-carrier frequency is sent out from both antennas 10 and 11. In the exemplary OFDM symbol units shown in FIG. 1, four pilot signals included in the OFDM symbol unit sent out from the horizontal polarization antenna 10 are also included in the OFDM symbol unit sent out from the vertical polarization antenna 11. In other words, four pilot signals are located on the same positions of the sub-carrier frequency axes in both OFDM symbol units.

Though it is possible to transmit the pilot signals in the same manner as in the data signals, the pilot signals are transmitted in the manner described above in this embodiment. This is because there is a possibility that the number of the pilot signals may be different in both OFDM symbol units if the pilot signals are transmitted from two antennas 10, 11 in separation by carrier frequencies. If the numbers of the pilot signals in both OFDM symbol units are different, the phase adjustment may not be carried out correctly.

Figure 2:
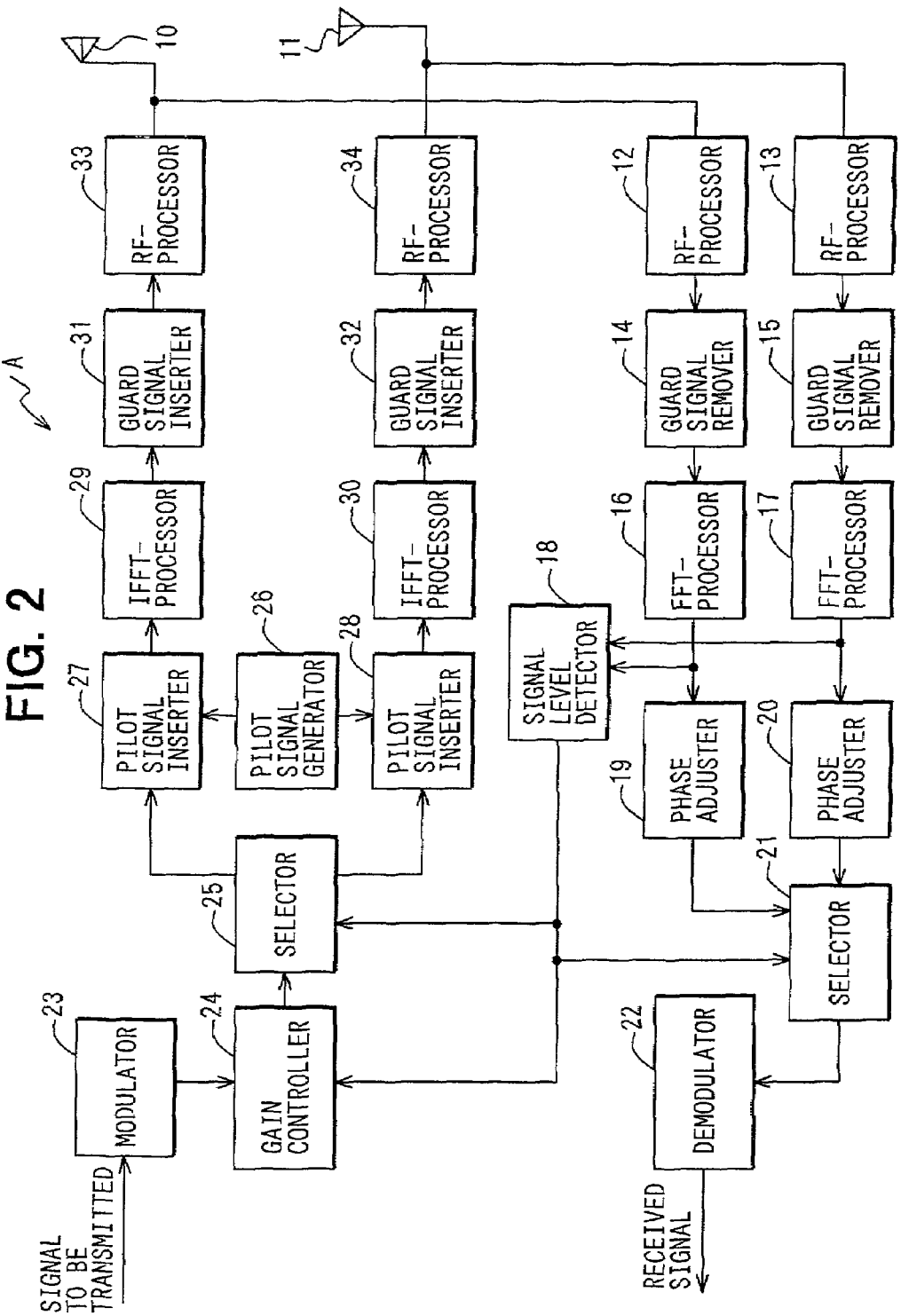
FIG. 2 is a block diagram showing a base terminal A used in the system shown in FIG. 1.
Figure 3:
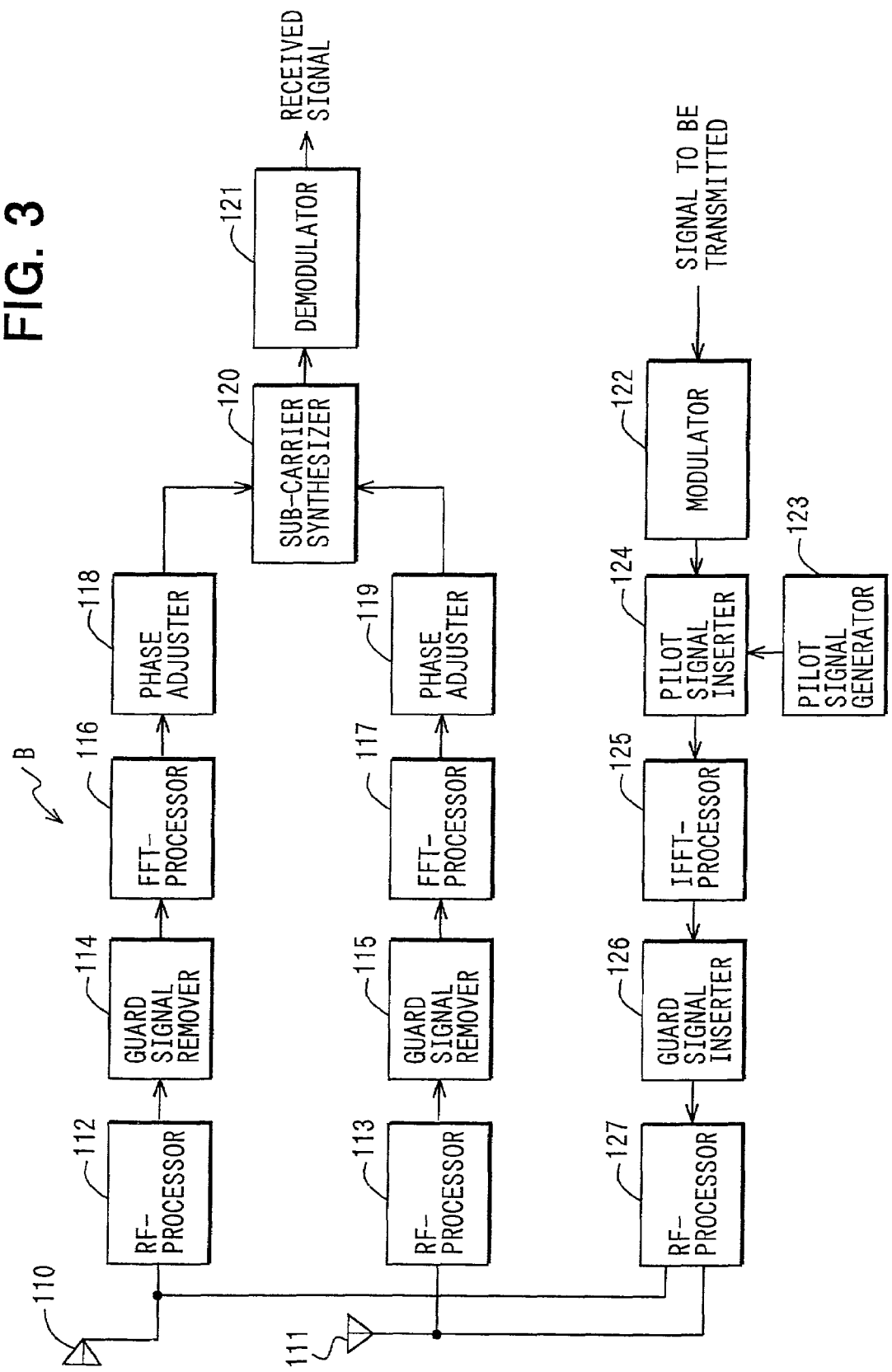
FIG. 3 is a block diagram showing a mobile terminal B used in the system shown in FIG. 1.
Figure 4:
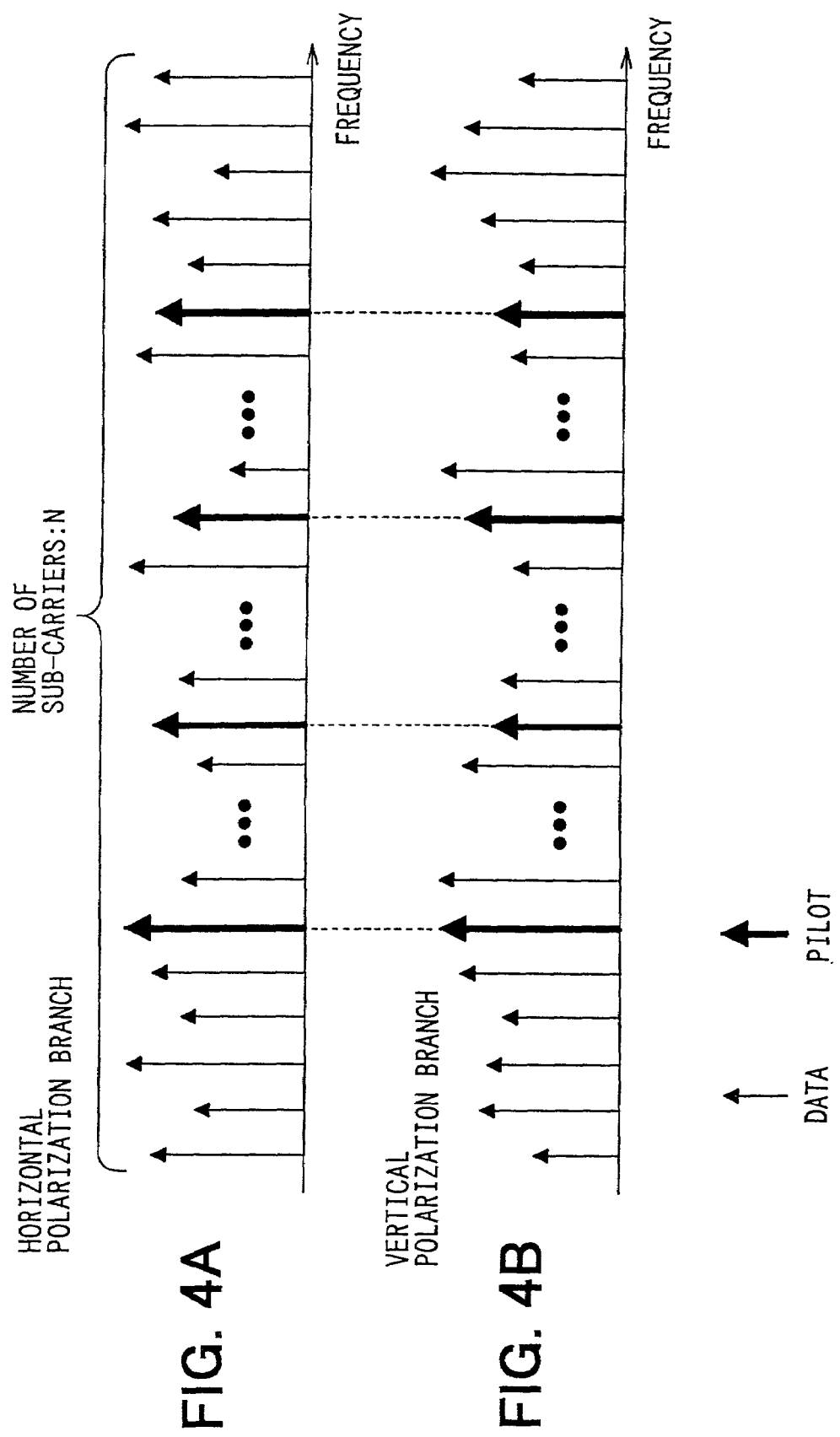
FIG. 4A is a chart showing outputs from an FFT-processor 16 in a base terminal A.
FIG. 4B is a chart showing outputs from another FFT-processor 17 in the base terminal A.
Figure 5:
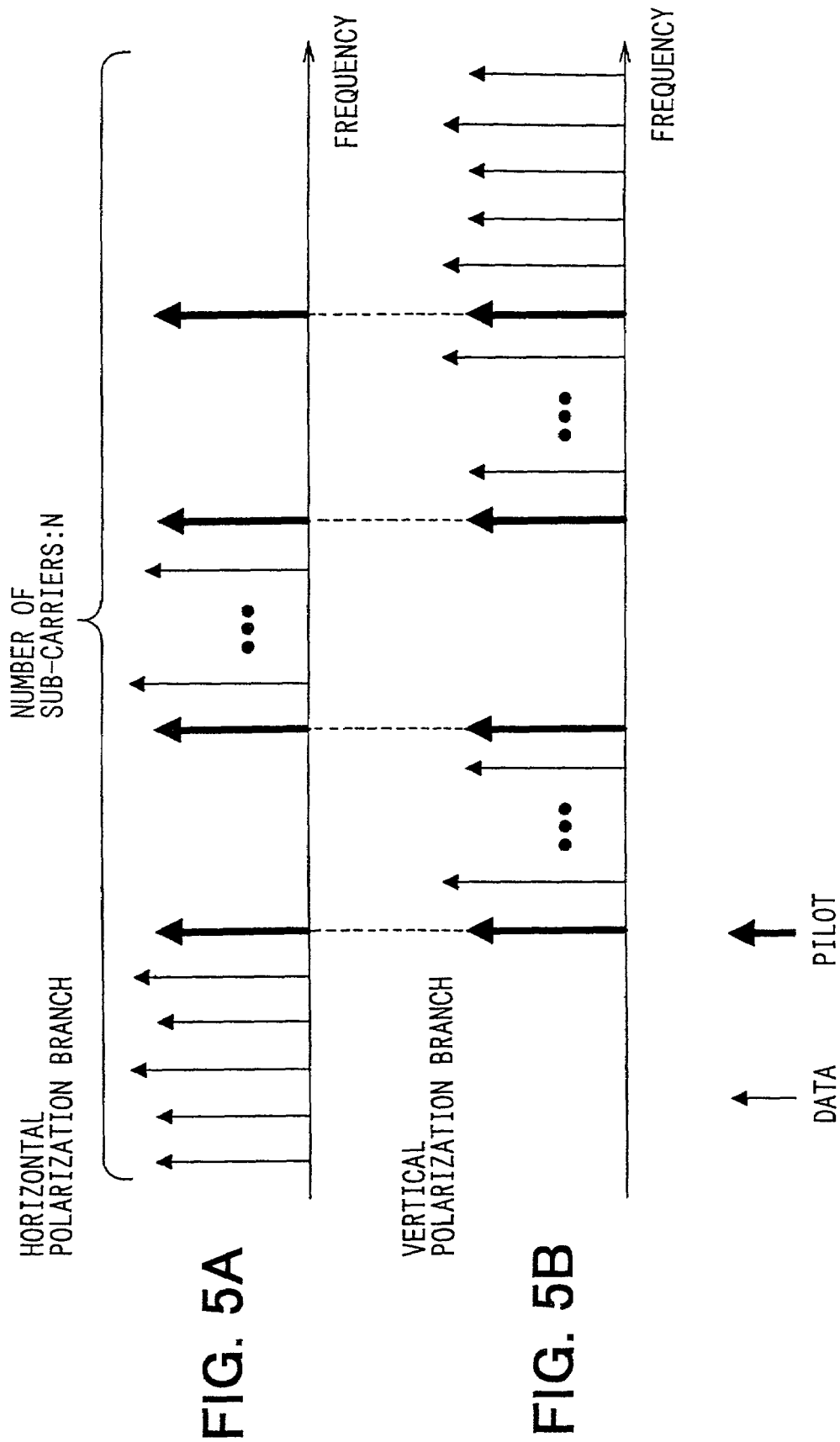
FIG. 5A is a chart showing inputs to an IFFT-processor 29 in the base terminal A.
FIG. 5B is a chart showing inputs to another IFFT-processor 30 in the base terminal A.
Figure 6:
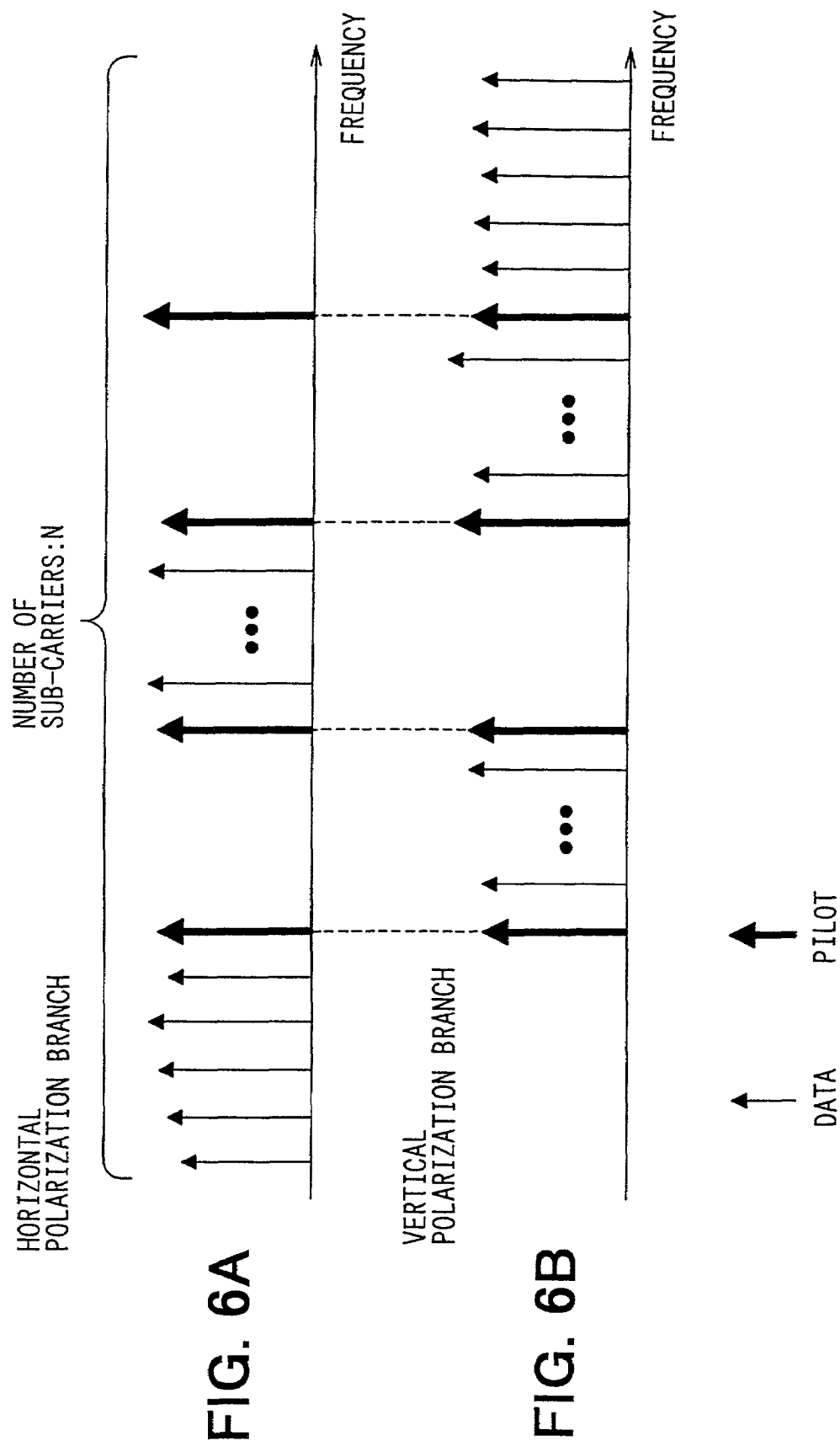
FIG. 6A is a chart showing outputs from an FFT-processor 116 in a mobile terminal B.
FIG. 6B is a chart showing outputs from another FFT-processor 117 in the mobile terminal B.

The structure and function of the first embodiment will be further described in detail with reference to FIGS. 2–7. The transmitter-receiver as the base terminal A and the transmitter-receiver as the mobile terminal B are shown in FIGS. 2 and 3, respectively. In the receiver of the base terminal A shown in FIG. 2, the OFDM signals received by both of the horizontal polarization antenna 10 and the vertical polarization antenna 11 are processed as follows: The OFDM signals are RF-processed through RF-processors 12, 13; guard signals attached to a head portion of each OFDM signal unit are removed; and then, the signals are FFT-processed by FFT-processors 16, 17. The outputs from the FFT-processor 16, which are outputs through the horizontal polarization branch including the horizontal polarization antenna 10, are shown in FIG. 4A. The outputs from the FFT-processor 17, which are outputs through the vertical polarization branch including the vertical polarization antenna 11, are shown in FIG. 4B.

The outputs from the FFT-processors 16, 17 are fed to a signal level detector 18. The signal level detector 18 compares both outputs from the FFT-processor 16 and from the FFT-processor 17 for each sub-carrier and determines which one of the output levels is higher. The outputs from the FFT-processors 16, 17 are also fed to phase adjusters 19, 20, respectively, to adjust the signal phase. The phase adjusters 19, 20 are the same ones as shown in FIG. 11. The outputs from the phase adjusters 19, 20 are fed to a selector 21 that selects one of the outputs having a higher level according to information fed from the signal level detector 18. The outputs from the selector 21 are fed to a demodulator 22 that demodulates the signals. Thus, received signals in a form of a series of digital data are obtained.

In the transmitter of the base terminal A, signals to be transmitted are modulated by a modulator 23, and gains thereof are controlled by a gain controller 24. The gains are controlled for each sub-carrier based on the signal levels detected by the signal level detector 18 so that all the sub-carrier levels become equal at the receiving end, i.e., at the mobile terminal B. A selector 25 divides the data signals modulated under respective sub-carriers into two groups, one group to be fed to the horizontal polarization branch and the other group to be fed to the vertical polarization branch, based on the information fed from the signal level detector 18, so that respective data signals are transmitted through a branch having a higher performance.

A pair of pilot signal inserters 27, 28 are connected to the selector 25, and pilot signals generated in a pilot signal generator 26 are supplied to both pilot signal inserters 27, 28. The pilot signal inserters 27, 28 insert pilot signals into the modulated data signals with certain intervals. The outputs of the pilot signal inserters 27, 28 are fed to IFFT-processors 29, 30, respectively. The signals fed to the IFFT-processor 29 (in the horizontal polarization branch) are shown in FIG. 5A, and the signals fed to the IFFT-processor 30 (in the vertical polarization branch) are shown in FIG. 5B. The signals fed to the IFFT-processors 29, 30 are IFFT-processed in the IFFT-processors 29, 30, and then fed to guard signal inserters 31, 32 that add a guard signal to a front of the OFDM signal unit. Then, the signals are RF-processed in RF-processors 33, 34 and transmitted from the horizontal polarization antenna 10 and the vertical polarization antenna 11.

In summary, the base terminal A transmits data signals modulated under respective sub-carriers from either one of the antennas, the horizontal polarization antenna 10 or the vertical polarization antenna 11, which has a higher performance for the respective sub-carriers. On the other hand, the pilot signals inserted into the data signals are transmitted from both antennas 10, 11. The pilot signals are inserted at same positions on both sub-carrier frequency axes of the signals transmitted through the horizontal polarization branch and the vertical polarization branch. That is, the OFDM signals shown in FIG. 1 are sent out from the base terminal A.

Referring to FIG. 3, the structure and function of the transmitter-receiver as the mobile terminal B will be described. In the receiver of the mobile terminal B, the OFDM signals received by both of the horizontal polarization antenna 110 and the vertical polarization antenna 111 are RF-processed in RF-processors 112, 113. Guard signal removers 114, 115 remove the guard signals, and feed the outputs to FFT-processors 116, 117 that process the signals under the FFT. The outputs from the FFT-processor 116 (horizontal polarization outputs) are shown in FIG. 6A, and the outputs from the FFT-processor 117 (vertical polarization outputs) are shown in FIG. 6B.

Phase adjusters 118, 119, having the same structure as that shown in FIG. 11, adjust the phase of signals fed from the FFT-processors 116, 117, respectively. The phase-adjusted respective data signals are synthesized in a sub-carrier synthesizer 120. A demodulator 121 demodulates the synthesized data signals to obtain a series of digital data signals as received signals.

Figure 7:
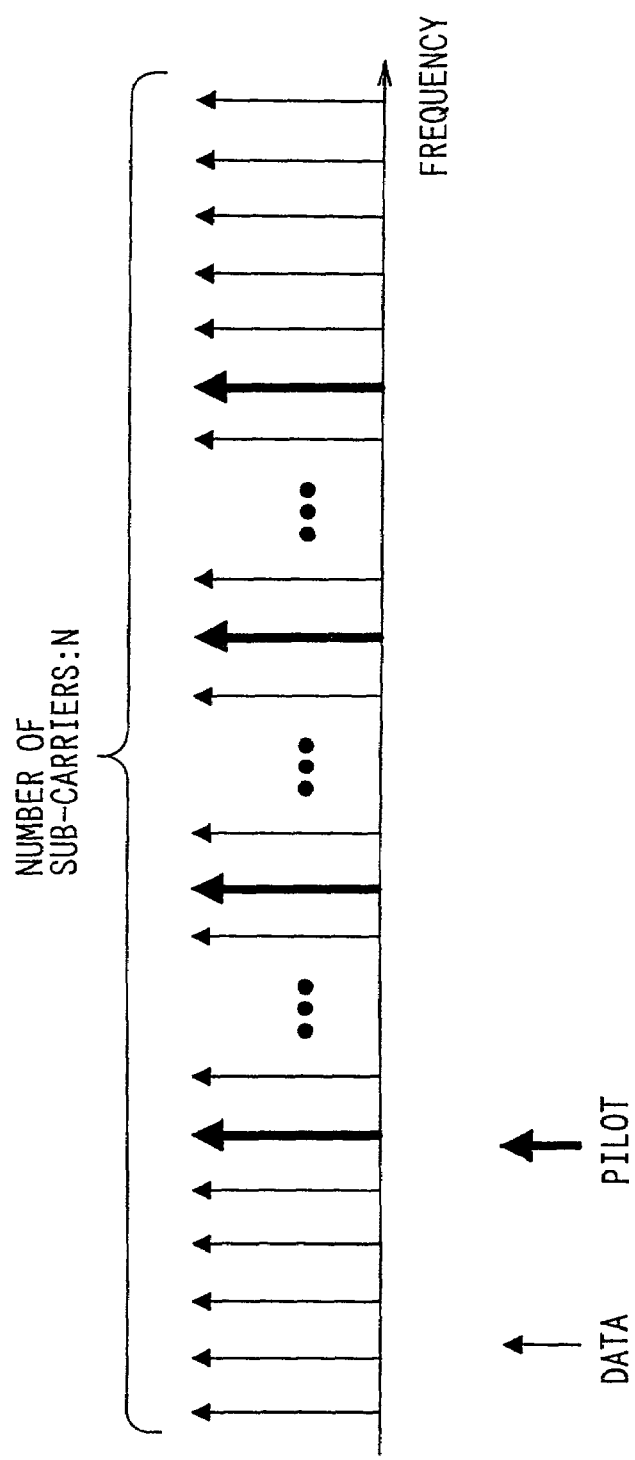
FIG. 7 is a chart showing inputs to an IFFT-processor 125 in the mobile terminal B.

In the transmitter of the mobile terminal B, data signals to be transmitted are modulated in a modulator 122 and fed to a pilot signal inserter 124 that inserts pilot signals generated in a pilot signal generator 123 into the data signals with certain intervals. The outputs from the pilot signal inserter 124 (which are shown in FIG. 7) are fed to an IFFT-processor 125. The IFFT-processed signals are fed to a guard signal inserter 126 that inserts a guard signal at a front portion of the OFDM signal unit. Then, the signals are RF-processed in an RF-processor 127 to send out the OFDM signals from both of the horizontal polarization antenna 110 and the vertical polarization antenna 111.

As described above, the mobile terminal B receives the OFDM data signals modulated under respective sub-carriers through either one of the horizontal polarization antenna 110 or the vertical polarization antenna 111, while it receives the same OFDM pilot signals through both antennas 110, 111. The data signals received through respective branches are phase-adjusted under the pilot signals commonly received through both branches. Therefore, the phase-adjustment can be accurately performed. On the other hand, the OFDM signals sent out through both branches, i.e., through the horizontal polarization antenna 110 and the vertical polarization antenna 111 include the pilot signals inserted into the common sub-carrier frequency positions. Therefore, the base terminal A can accurately adjust the data signal phase upon receiving such OFDM signals transmitted from the mobile terminal B.

Figure 8:
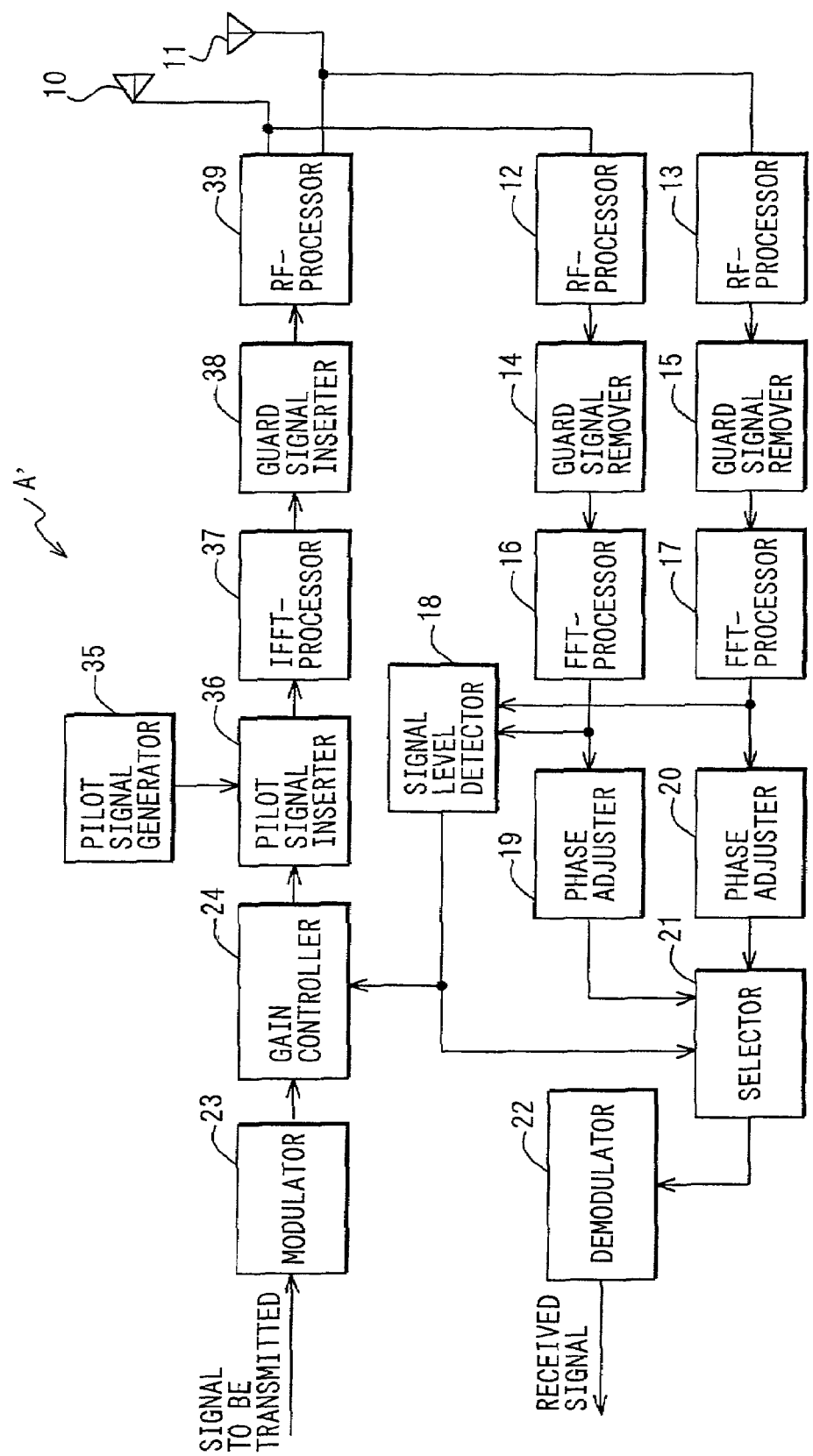
FIG. 8 is a block diagram showing a base terminal A' as a second embodiment of the present invention.

A second embodiment of the present invention will be described with reference to FIGS. 8 and 9. FIG. 8 shows a structure of a transmitter-receiver as a base terminal A', and FIG. 9 shows a transmitter-receiver as a mobile terminal B'.

Figure 9:
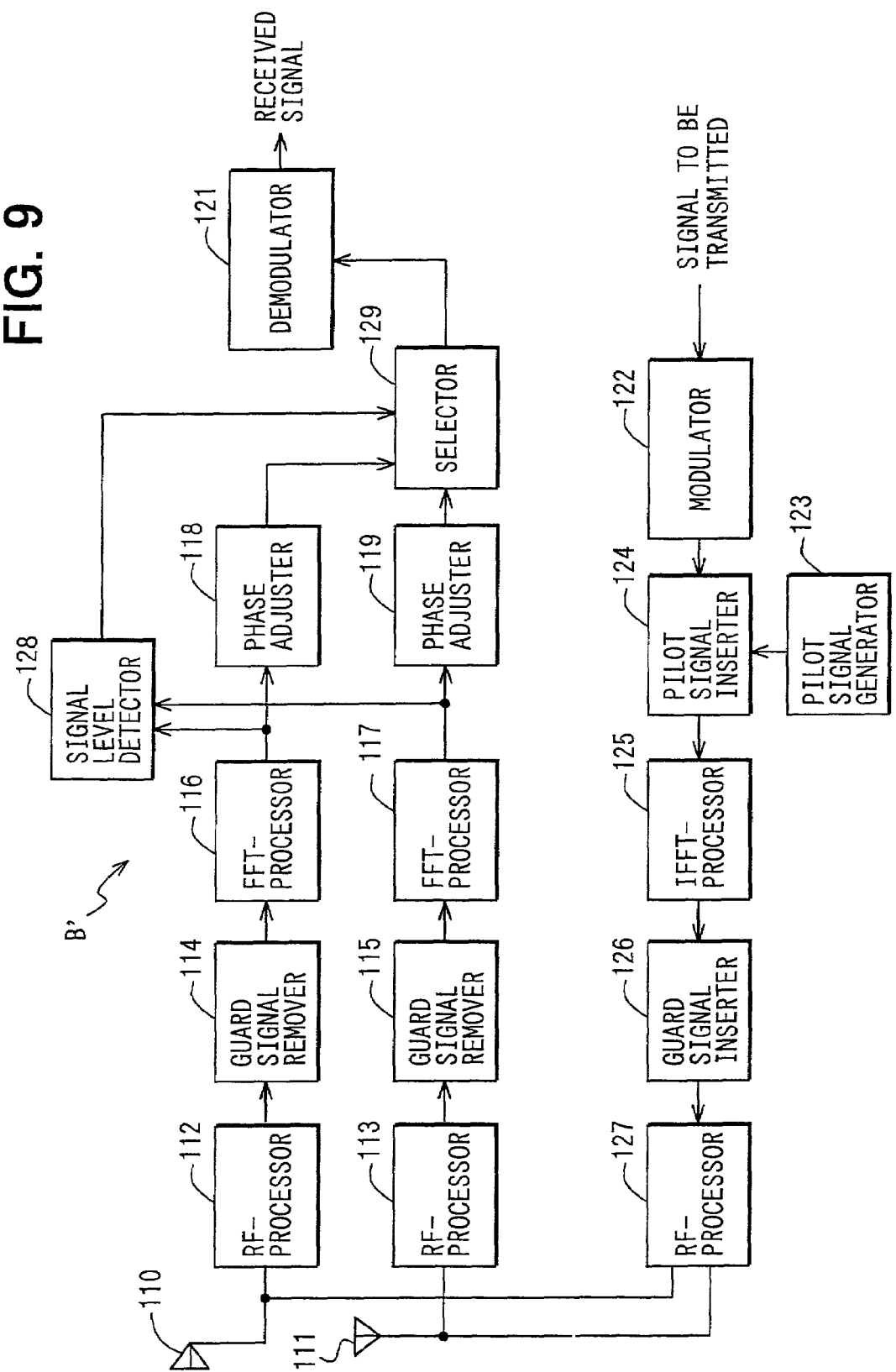
FIG. 9 is a block diagram showing a mobile terminal B' as the second embodiment of the present invention.

The reference numerals used in FIGS. 8 and 9, which are common to those in FIGS. 2 and 3, denote the same or substantially same components. The receiver of the second embodiment is the same as that of the first embodiment, and the transmitter of the second embodiment is somewhat different from that of the first embodiment. In the first embodiment, the OFDM data signals are separated into two branches according to sub-carrier frequencies modulating respective signals. In the second embodiment, however, the same OFDM data signals are transmitted through both branches, i.e., through the horizontal polarization branch and the vertical polarization branch, in the same manner as the pilot signals.

In the transmitter of the base terminal A' shown in FIG. 8, the gain-controlled data signals are fed to a pilot signal inserter 36 that inserts pilot signals generated in a pilot signal generator 35. Then, the signals are IFFT-processed in an IFFT-processor 37, and the guard signals are added in a guard signal inserter 38. The signals are RF-processed in an RF-processor 39 and transmitted from the horizontal polarization antenna 10 and the vertical polarization antenna 11 as the OFDM signals. Therefore, the OFDM signals having the same structure are transmitted from both antennas 10, 11.

The transmitter of the mobile terminal B' shown in FIG. 9 is the same as that of the first embodiment shown in FIG. 3. The receiver of the mobile terminal B' is somewhat different from that of the first embodiment shown in FIG. 3. In the receiver of the mobile terminal B', the OFDM signals received by both antenna 110, 111 are processed through the RF-processors 112, 113, the guard removers 114, 115 and the FFT-processors 116, 117 in the same manner as in the first embodiment. The outputs from the FFT-processors 116 (the horizontal polarization branch outputs) and the output from the FFT-processor 117 (the vertical polarization branch outputs) are fed to a signal level detector 128. The signal level detector 128 determines which branch outputs have a higher signal level for each sub-carrier. Both branch outputs are also fed to the phase adjusters 118, 119, respectively, and their phases are adjusted. A selector 129 selects a data signal having a higher level from both branch signals for each sub-carrier. The selected signals are synthesized in the demodulator 121, demodulated in the demodulator 121 and outputted therefrom in a form of a series of digital data.

Since, in the second embodiment, the same OFDM signals are transmitted and received through both antennas, the horizontal polarization antenna and the vertical polarization antenna, the OFDM signals are demodulated at the receiving end with high accuracy, even if the mobile terminal as the receiving end moves and changes its positions.

While the present invention has been shown and described with reference to the foregoing preferred embodiments, it will be apparent to those skilled in the art that changes in form and detail may be made therein without departing from the scope of the invention as defined in the appended claims. For example, the phase adjusters 19, 20 in the first embodiment may adjust only the phase of signals of one branch having higher levels based on information from the signal level detector 18. Similarly, the phase adjusters 118, 119 in the second embodiment may adjust only the phase of signals of one branch having higher levels based on information from the signal level detector 128.

What is claimed is:

1. An OFDM communication system handling OFDM signals composed of a plurality of sub-carriers, the OFDM communication system comprising:

a first transmitter-receiver having a first horizontal polarization antenna and a first vertical polarization antenna, first OFDM signals including data signals and pilot signals being transmitted from the first horizontal polarization antenna, second OFDM signals including data signals and pilot signals being transmitted from the first vertical polarization antenna; and a second transmitter-receiver having a second horizontal polarization antenna for receiving the first OFDM signals, a second vertical polarization antenna for receiving the second OFDM signals and a demodulator, the data signals in the first OFDM signals being phase-adjusted using the pilot signals in the first OFDM signals after the first OFDM signals are FFT-processed, the data signals in the second OFDM signals being phase-adjusted using the pilot signals in the second OFDM signals after the second OFDM signals are FFT-processed, both of the phase-adjusted data signals being demodulated by the demodulator, wherein:

the pilot signals included in the first OFDM signals and in the second OFDM signals are positioned at sub-carrier positions common to both of the OFDM signals;

the first transmitter-receiver further includes a signal level detector for comparing a signal level receiver by the first horizontal polarization antenna with a signal level received by the first vertical polarization antenna for each sub-carrier after signals received by both of the first antennas are FFT-processed and for determining which one of the signal levels is higher than the other, and means for selecting either the first horizontal polarization antenna or the first vertical polarization antenna based on the determination of the signal level detector, so that the data signals for each sub-carrier are transmitted from the selected antenna which is determined to have a higher signal level, wherein:

the first OFDM signals transmitted from the first horizontal polarization antenna and the second OFDM signals transmitted from the first vertical polarization antenna are the same signals;

the second transmitter-receiver further includes: a signal level detector for detecting which signal level is higher in the signals received by the second horizontal polarization antenna or in the signals received by the second vertical polarization antenna; a selector for selecting signals having a higher signal level for each sub-carrier based on detecting results of the signal level detector; and a sub-carrier synthesizer for synthesizing the selected sub-carriers; and the demodulator demodulates synthesized sub-carriers.

2. A transmitter-receiver as a base terminal for use in an OFDM communication system handling OFDM signals that include data signals and pilot signals transmitted by a plurality of sub-carriers, the transmitter-receiver comprising:

a horizontal polarization antenna;

a vertical polarization antenna;

means for respectively FFT-processing OFDM signals received by both antennas and for outputting FFT-processed signals;

a signal level detector for determining which one of both antennas has a higher performance for each sub-carrier frequency based on signal levels of the FFT-processed signals;

means for dividing the data signals to be transmitted for each sub-carrier frequency into a first data signal group to be transmitted from the horizontal polarization antenna and a second data signal group to be transmitted from the vertical polarization antenna, so that respective data signals are transmitted from either one of both antennas which has a higher performance;

means for inserting common pilot signals into both data signal groups, thereby forming first OFDM signal to be transmitted from the horizontal polarization antenna and a second OFDM signals to be transmitted from the vertical polarization antenna;

means for transmitting the first OFDM signals from the horizontal polarization antenna and the second OFDM signals from the vertical polarization antenna, wherein:

the first OFDM signals transmitted from the first horizontal polarization antenna and the second OFDM signals transmitted from the first vertical polarization antenna are the same signals.

3. The transmitter-receiver as in claim 2, wherein:
the common pilot signal inserting means comprises a pilot signal generator, a first pilot signal inserter for inserting the pilot signals fed from the pilot signal generator into the first data signal group, and a second pilot inserter for inserting the pilot signals fed from the pilot signal generator into the second data signal group.

4. The transmitter-receiver as in claim 2, wherein:
the demodulating means comprises: a first phase adjuster for adjusting phase of the data signals in the signals FFT-processed from the OFDM signals received by the horizontal polarization antenna based on the pilot signals; a second phase adjuster for adjusting phase of the data signals in the signals FFT-processed from the OFDM signals received by the vertical polarization antenna based on the pilot signals; and a selector for selecting one of the phase-adjusted data signals which has a higher signal level based on information fed from the signal level detector.

5. A transmitter-receiver as a mobile terminal for use in an OFDM communication system handling OFDM signals that include data signals and pilot signals, the transmitter-receiver comprising:
a horizontal polarization antenna for receiving first OFDM signals;
a vertical polarization antenna for receiving second OFDM signal;
a first phase adjuster for adjusting phase of the data signals in the signals FFT-processed from the first OFDM signals using the pilot signals included in the first OFDM signals;
a second phase adjuster for adjusting phase of the data signals in the signals FFT-processed from the second OFDM signals using the pilot signals included in the second OFDM signals;
wherein the pilot signals included in the first OFDM signals and in the second OFDM signals are positioned at sub-carrier positions common to both of the OFDM signals;
wherein the first OFDM signals transmitted from the first horizontal polarization antenna and the second OFDM signals transmitted from the first vertical polarization antenna are the same signals;
a signal level detector for detecting which signal level is higher in the signals received by the horizontal polarization antenna or in the signals received by the vertical polarization antenna;
a selector for selecting signals having a higher signal level for each sub-carrier based on detecting results of the signal level detector; and
a sub-carrier synthesizer for synthesizing the selected sub-carriers; and
a demodulator demodulates synthesized sub-carriers.

6. A transmitter-receiver as a mobile terminal for use in an OFDM communication system handling OFDM signals that include data signals and pilot signals, the transmitter-receiver comprising:
a horizontal polarization antenna for receiving first OFDM signals;
a vertical polarization antenna for receiving second OFDM signals;
means for FFT-processing the first OFDM signals to output first FFT-processed signals and for FFT-processing the second OFDM signals to output second FFT-processing signals;
a signal level detector for detecting which signal level is higher in the first FFT-processing signals or in the second FFT-processed signals;
a first phase adjuster for adjusting phase of the data signals in the first FFT-processed signals using the pilot signals included in the first OFDM signals;
a second phase adjuster for adjuster phase of the data signals in the second FFT-processed signals using the pilot signals included in the second OFDM signals;
a selector for selecting data signals which have a higher signal level from the phase-adjusted data signals by the first phase adjuster and the phase-adjusted data signals by the second phase adjuster for each sub-carrier frequency, based on information fed from the signal level detector;
a sub-carrier synthesizer for synthesizing selected sub-carriers; and
a demodulator for demodulating synthesized sub-carriers;
wherein the first OFDM signals transmitted from the first horizontal polarization antenna and the second OFDM signals transmitted from the first vertical polarization antenna are the same signals.

7. An OFDM communication system comprising:
a first transmitter-receiver having a first horizontal polarization antenna and a first vertical polarization antenna, first OFDM signals including data signals and pilot signals being transmitted from the first horizontal polarization antenna, second OFDM signals including data signals and pilot signals being transmitted from the first vertical polarization antenna; and
a second transmitter-receiver having a second horizontal polarization antenna for receiving the first OFDM signals, a second vertical polarization antenna for receiving the second OFDM signals and a demodulator, the data signals in the first OFDM signals being phase-adjusted using the pilot signals in the first OFDM signals after the first OFDM signals are FFT-processed, the data signals in the second OFDM signals being phase-adjusted using the pilot signals in the second OFDM signals after the second OFDM signals are FFT-processed, both of the phase-adjusted data signals being demodulated by the demodulator, wherein:
the OFDM communication system handles OFDM signals composed of a plurality of sub-carriers;
the first OFDM signals transmitted from the first horizontal polarization antenna and the second OFDM signals transmitted from the first vertical polarization antenna are the same signals;
the second transmitter-receiver further includes: a signal level detector for detecting which signal level is higher in the signals received by the second horizontal polarization antenna or in the signals received by the second vertical polarization antenna; a selector for selecting signals having a higher signal level for each sub-carrier based on detecting results of the signal level detector;

and a sub-carrier synthesizer for synthesizing the selected sub-carriers; and the demodulator demodulates synthesized sub-carriers.

8. The OFDM communication system as in claim 7, wherein:

the first transmitter-receiver further includes a signal level detector for comparing a signal level received by the first horizontal polarization antenna with a signal level received by the first vertical polarization antenna for each sub-carrier after signals received by both of the first antennas are FFT-processed and for determining which one of the signal levels is higher than the other, and means for selecting either the first horizontal polarization antenna or the first vertical polarization antenna based on the determination of the signal level detector, so that the data signals for each sub-carrier are transmitter from the selected antenna which is determined to have a higher signal level.

* * * * *